(12) United States Patent
Spangler et al.

(10) Patent No.: US 10,934,857 B2
(45) Date of Patent: Mar. 2, 2021

(54) SHELL AND SPAR AIRFOIL

(71) Applicant: United Technologies Corporation, Farmington, CT (US)

(72) Inventors: Brandon W. Spangler, Vernon, CT (US); Adam P. Generale, Dobbs Ferry, NY (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 212 days.

(21) Appl. No.: 16/210,052

(22) Filed: Dec. 5, 2018

(65) Prior Publication Data

US 2020/0182071 A1 Jun. 11, 2020

(51) Int. Cl.
*F01D 5/18* (2006.01)
*F01D 5/14* (2006.01)
*F01D 5/28* (2006.01)

(52) U.S. Cl.
CPC .............. *F01D 5/189* (2013.01); *F01D 5/147* (2013.01); *F01D 5/141* (2013.01); *F01D 5/282* (2013.01); *F01D 5/284* (2013.01)

(58) Field of Classification Search
CPC .......... F01D 5/141; F01D 5/147; F01D 5/188; F01D 5/189; F01D 5/282; F01D 5/284; F05D 2220/32; F05D 2230/64; F05D 2230/642; F05D 2300/177; F05D 2300/20; Y02T 50/676
See application file for complete search history.

(56) References Cited

U.S. PATENT DOCUMENTS

| 3,644,060 A | 2/1972 | Bryan |
| 5,516,260 A * | 5/1996 | Damlis ............... F01D 5/189 |
| | | 415/115 |
| 6,224,339 B1 | 5/2001 | Rhodes et al. |
| 7,497,655 B1 | 3/2009 | Liang |
| 7,824,150 B1 | 11/2010 | Kimmel et al. |

(Continued)

FOREIGN PATENT DOCUMENTS

EP 2204537 B1 8/2017

OTHER PUBLICATIONS

European Search Report for European Application No. 19212661.3, International filing Date Nov. 29, 2019, dated Apr. 14, 2020, 10 pages.

*Primary Examiner* — Igor Kershteyn
(74) *Attorney, Agent, or Firm* — Cantor Colburn LLP

(57) ABSTRACT

Airfoils, shells, and spars are provided. The airfoils include a shell having a first channel and a first engagement element arranged along the first channel and a spar having a second channel and a second engagement element arranged along the second channel and the spar defines an inner cavity. A connector is configured to be installed between and connect the shell and the spar to allow for thermal growth of the shell relative to the spar. The connector has first and second engageable portions connected by a link. The first engageable portion is configured to engage with the shell and the second engageable portion is configured to engage with the spar. When assembled, an outer cavity is formed between the spar and the shell, and the first and second engagement elements and the first and second engageable portions are configured to define an axial flow path through the outer cavity.

20 Claims, 12 Drawing Sheets

(56) References Cited

U.S. PATENT DOCUMENTS

| | | | |
|---|---|---|---|
| 7,828,515 B1 | 11/2010 | Kimmel | |
| 8,322,988 B1 * | 12/2012 | Downs | F01D 5/147 |
| | | | 416/96 R |
| 8,403,626 B2 * | 3/2013 | Hasselqvist | F01D 5/143 |
| | | | 415/91 |
| 9,506,350 B1 | 11/2016 | Memmen | |
| 9,581,028 B1 * | 2/2017 | Jones | F01D 5/18 |
| 2003/0049127 A1 | 3/2003 | Tiemann | |
| 2006/0120869 A1 * | 6/2006 | Wilson | F01D 5/147 |
| | | | 416/97 R |
| 2011/0123351 A1 * | 5/2011 | Hada | F01D 5/189 |
| | | | 416/97 R |
| 2016/0251965 A1 * | 9/2016 | Henderkott | B23P 6/007 |
| | | | 60/752 |
| 2017/0122112 A1 | 5/2017 | Davis et al. | |
| 2018/0328188 A1 * | 11/2018 | Marinelli | F01D 5/188 |

\* cited by examiner

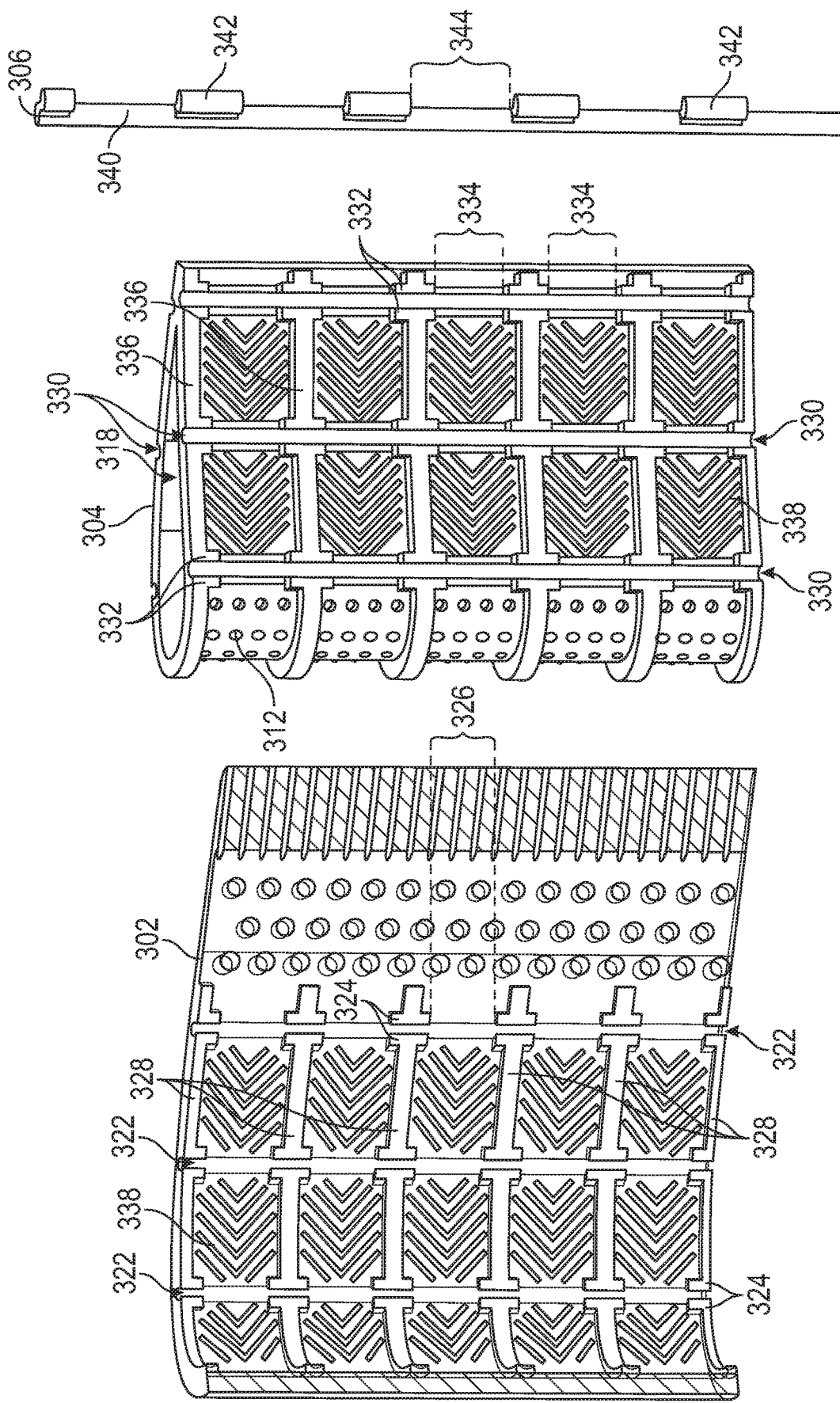

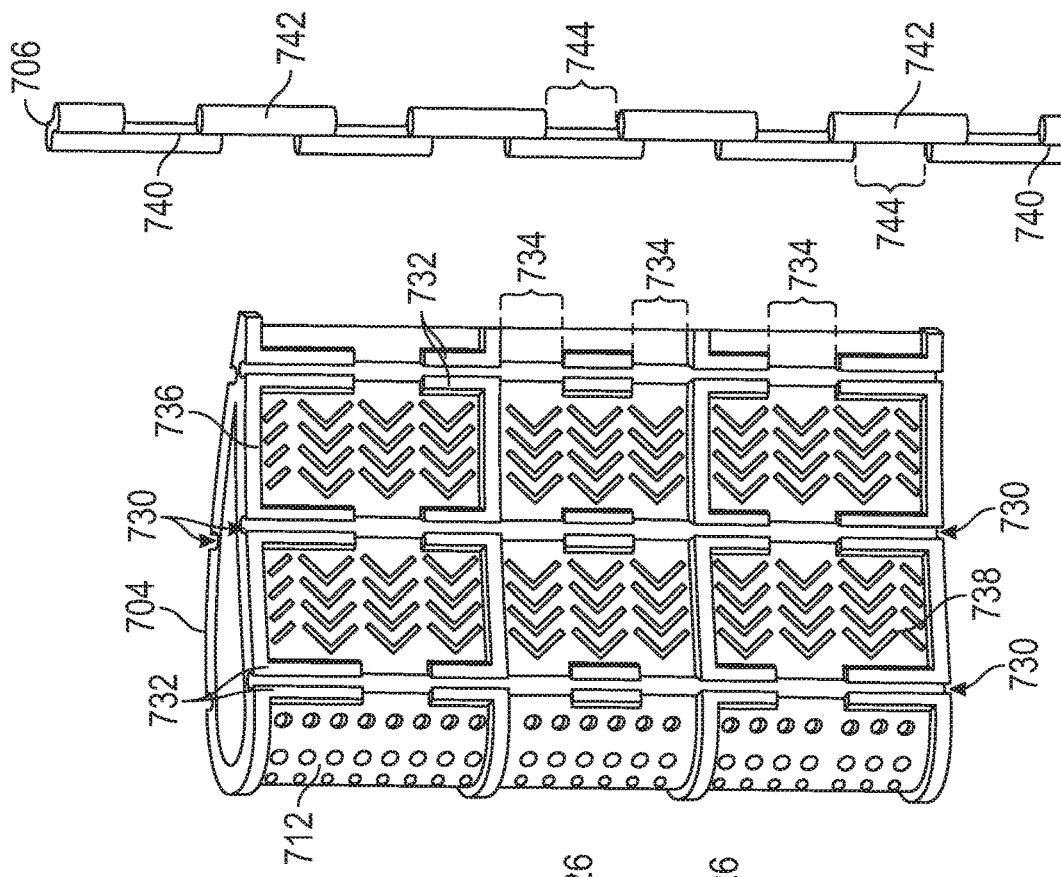
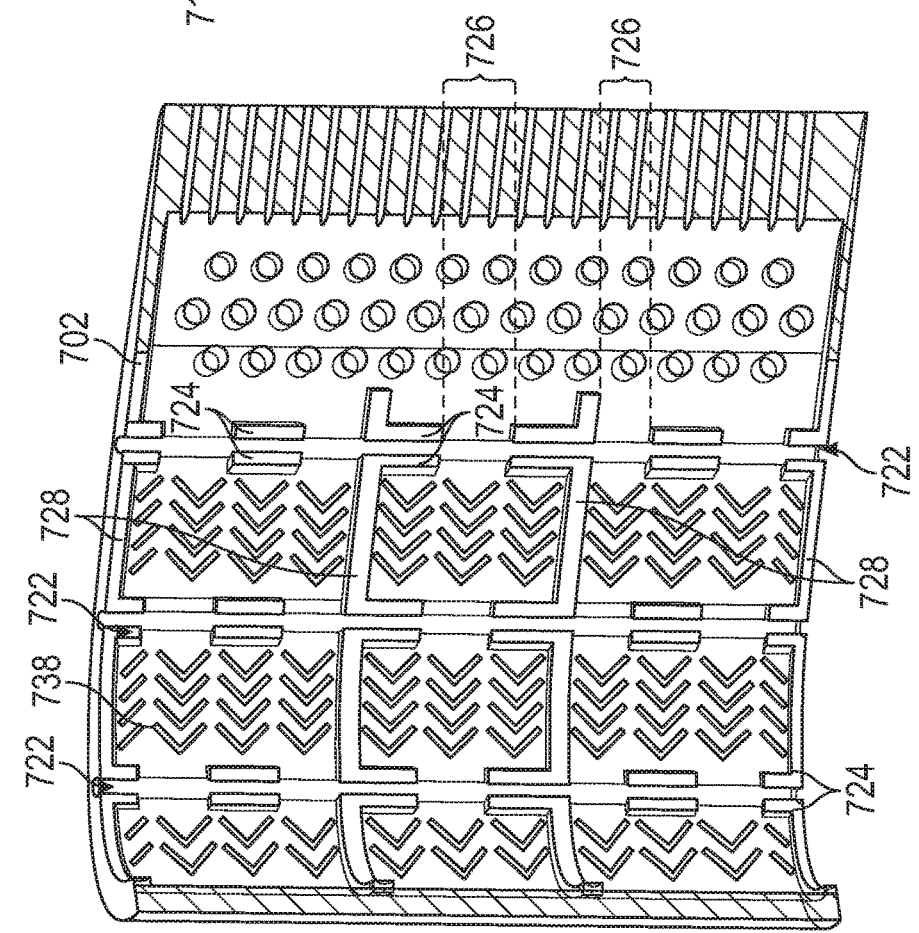
FIG. 7A
FIG. 7B
FIG. 7C

SHELL AND SPAR AIRFOIL

BACKGROUND

The subject matter disclosed herein generally relates to airflow in components of gas turbine engines and, more particularly, to shell and spar airfoils for gas turbine engines.

Airfoils, and particularly airfoils of gas turbine engines, may include internal flow passages to enable cooling of the airfoils. The supply of the cooling air through cavities of the airfoils may be carefully designed so as to provide an efficient cooling configuration. However, various structures and/or features of the airfoils may impact cooling schemes, thus reducing the efficiency and/or effectiveness of a cooling scheme.

One type of airfoil construction is a spar-and-shell configuration, with the spar providing a structural frame with the shell installed external thereto. As such, the shell defines an external surface, such as a flow surface, and may be exposed to high temperatures within a gas turbine engine.

Spar-and-shell airfoils may be subject to the shell and the spar having high thermal stress loads formed due to large temperature differences (e.g., high temperature at shell, relatively low temperature at the spar). The shell is exposed to the high temperature gas flow while the spar is cooled with cooling air so that the temperature is much lower than the shell. If the shell is rigidly secured to the spar (e.g., at ribs), the temperature difference will produce high thermal stress loads on the ribs that connect the shell to the spar. A number of ribs are required to hold the thin shell wall to the spar when a high cooling air pressure is formed between the shell and the spar that tends to push the shell wall away from the spar. Thus, the ribs are used to hold the thin shell wall to the spar so that high pressure cooling air can be used between these two surfaces. If the ribs are rigidly fixed to the spar and the shell, then the high thermal stress loads may produce cracks in the ribs. Accordingly, improved spar-and-shell airfoil configurations may be desirable.

SUMMARY

According to some embodiments, airfoils of gas turbine engines are provided. The airfoils include a shell having a first receiving channel and a first engagement element arranged along the first receiving channel, the first receiving channel extending in a radial direction along the shell between a first end and a second end of the shell in the radial direction, a spar having a second receiving channel and a second engagement element arranged along the second receiving channel, the second receiving channel extending in a radial direction along the shell between a first end and a second end of the spar in the radial direction, wherein the spar defines an inner cavity, and a connector configured to be installed between the shell and the spar to connect the shell to the spar to allow for thermal growth of the shell relative to the spar, wherein the connector comprises a first engageable portion and a second engageable portion connected by a link, wherein the first engageable portion is configured to engage with the first engagement element of the shell and the second engageable portion is configured to engage with the second engagement element of the spar. When assembled, an outer cavity is formed between the spar and the shell, and the first engagement element, second engagement element, the first engageable portion, and the second engageable portion are configured to define an axial flow path through the outer cavity.

In addition to one or more of the features described above, or as an alternative, further embodiments of the airfoils may include at least one axial rib on at least one of the shell and the spar, wherein the at least one axial rib defines, in part, the axial flow path in the outer cavity.

In addition to one or more of the features described above, or as an alternative, further embodiments of the airfoils may include that the spar further comprises at least one impingement hole on a leading edge thereof.

In addition to one or more of the features described above, or as an alternative, further embodiments of the airfoils may include that, when assembled, impinging air is configured to flow from the inner cavity to the outer cavity at an inner surface leading edge of the shell and flow axially aftward through the axial flow path of the outer cavity.

In addition to one or more of the features described above, or as an alternative, further embodiments of the airfoils may include at least one heat transfer augmentation feature formed on at least one of an inner surface of the shell and an outer surface of the spar such that the at least one heat transfer augmentation feature is located within the outer cavity when the shell is attached to the spar by the connector.

In addition to one or more of the features described above, or as an alternative, further embodiments of the airfoils may include that the at least one heat transfer augmentation feature comprises at least one of trip strips, pedestals, and dimples.

In addition to one or more of the features described above, or as an alternative, further embodiments of the airfoils may include that both the inner surface of the shell and the outer surface of the spar comprise at least one heat transfer augmentation feature In addition to one or more of the features described above, or as an alternative, further embodiments of the airfoils may include that the connector has a lemniscate geometry in cross-section.

In addition to one or more of the features described above, or as an alternative, further embodiments of the airfoils may include that the shell is formed from at least one of nickel and ceramic matrix composite.

In addition to one or more of the features described above, or as an alternative, further embodiments of the airfoils may include that at least one of the first engageable portion and the second engageable portion of the connector comprise a segmented structure.

In addition to one or more of the features described above, or as an alternative, further embodiments of the airfoils may include that the segmented structure of the at least one of the first engageable portion and the second engageable portion defines connector gaps separating segments thereof.

In addition to one or more of the features described above, or as an alternative, further embodiments of the airfoils may include that both the first engageable portion and the second engageable portion of the connector comprise segmented structures.

In addition to one or more of the features described above, or as an alternative, further embodiments of the airfoils may include that the first engageable portion is a continuous element that, when installed, extends a full radial extent of the airfoil and the second engageable portion of the connector comprises a segmented structure.

In addition to one or more of the features described above, or as an alternative, further embodiments of the airfoils may include that the first engagement element extends a continuous full radial extent in a radial direction along the shell between the first end and the second end of the shell about the first receiving channel.

In addition to one or more of the features described above, or as an alternative, further embodiments of the airfoils may include that the shell further comprises a trailing edge cavity that is fluidly connected to the outer cavity when the shell is assembled to the spar.

In addition to one or more of the features described above, or as an alternative, further embodiments of the airfoils may include that the shell, the spar, and the connector form a vane of a gas turbine engine.

In addition to one or more of the features described above, or as an alternative, further embodiments of the airfoils may include that the shell, the spar, and the connector form a blade of a gas turbine engine.

In addition to one or more of the features described above, or as an alternative, further embodiments of the airfoils may include that the spar is formed from at least one of nickel and ceramic matrix composite.

In addition to one or more of the features described above, or as an alternative, further embodiments of the airfoils may include a plurality of additional first receiving channels formed on the shell, wherein each additional first receiving channel includes at least one first engagement element arranged along a radial length thereof, a plurality of additional second receiving channels formed on the spar, wherein each additional second receiving channel includes at least one second engagement element arranged along a radial length thereof, and a plurality of additional connectors configured to be installed between the shell and the spar in the plurality of additional first and second receiving channels.

In addition to one or more of the features described above, or as an alternative, further embodiments of the airfoils may include that the outer cavity comprises one or more radial flow paths.

According to some embodiments, spars for airfoils of gas turbine engines are provided. The spars include a spar body having a receiving channel and an engagement element arranged along the receiving channel, the receiving channel extending in a radial direction along the spar body between a first end and a second end of the spar body in the radial direction, wherein the spar body defines an inner cavity and wherein the receiving channel and the engagement element are arranged on an exterior surface of the spar body opposite the inner cavity. The engagement element comprises one or more radial gaps that define axial flow paths relative to the receiving channel and the receiving channel and the engagement element are configured to receive a connector to attach a shell to the spar.

According to some embodiments, shells for airfoils of gas turbine engines are provided. The shells include a shell body having a receiving channel and an engagement element arranged along the receiving channel, the receiving channel extending in a radial direction along the shell between a first end and a second end of the shell in the radial direction, the shell having an interior surface and an exterior surface, wherein the exterior surface defines a flow surface of the airfoil. The engagement element comprises one or more radial gaps that define axial flow paths relative to the receiving channel and wherein the receiving channel and the engagement element are configured to receive a connector to attach the shell to a spar.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3C is a schematic illustration of a portion of a shell of the airfoil of FIG. 3A;

FIG. 3D is a schematic illustration of a spar of the airfoil of FIG. 3A;

FIG. 3E is a schematic illustration of a connector that connects the shell to the spar to form the airfoil of FIG. 3A;

FIG. 7A is a schematic illustration of a portion of a shell of an airfoil in accordance with an embodiment of the present disclosure;

FIG. 7B is a schematic illustration of a spar that is connectable to the shell of FIG. 7A;

FIG. 7C is a schematic illustration of a connector that connects the shell of FIG. 7A to the spar of FIG. 7B to form an airfoil in accordance with an embodiment of the present disclosure.

DETAILED DESCRIPTION

Figure 1A:
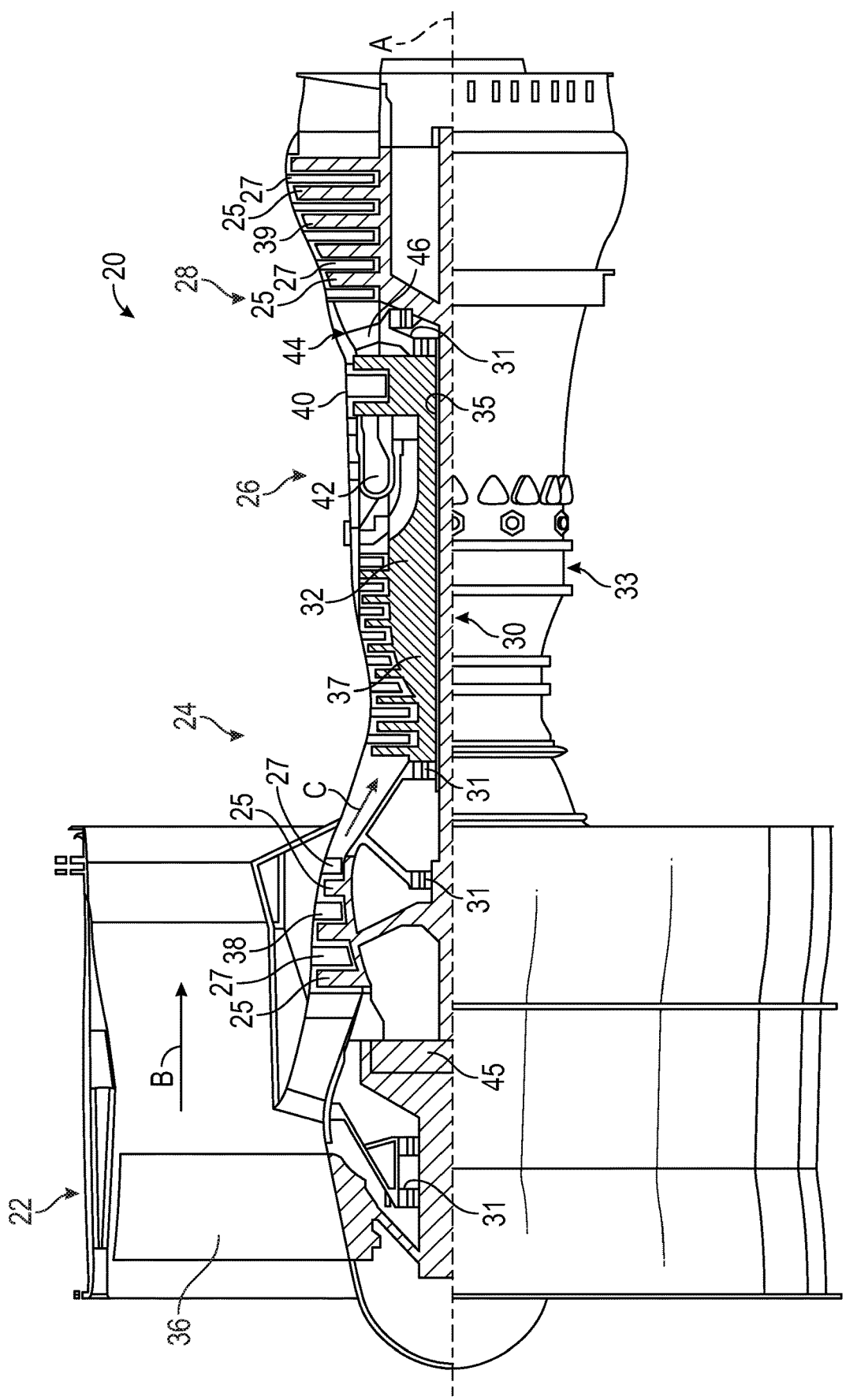
FIG. 1A is a schematic cross-sectional illustration of a gas turbine engine that may employ various embodiments disclosed herein.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
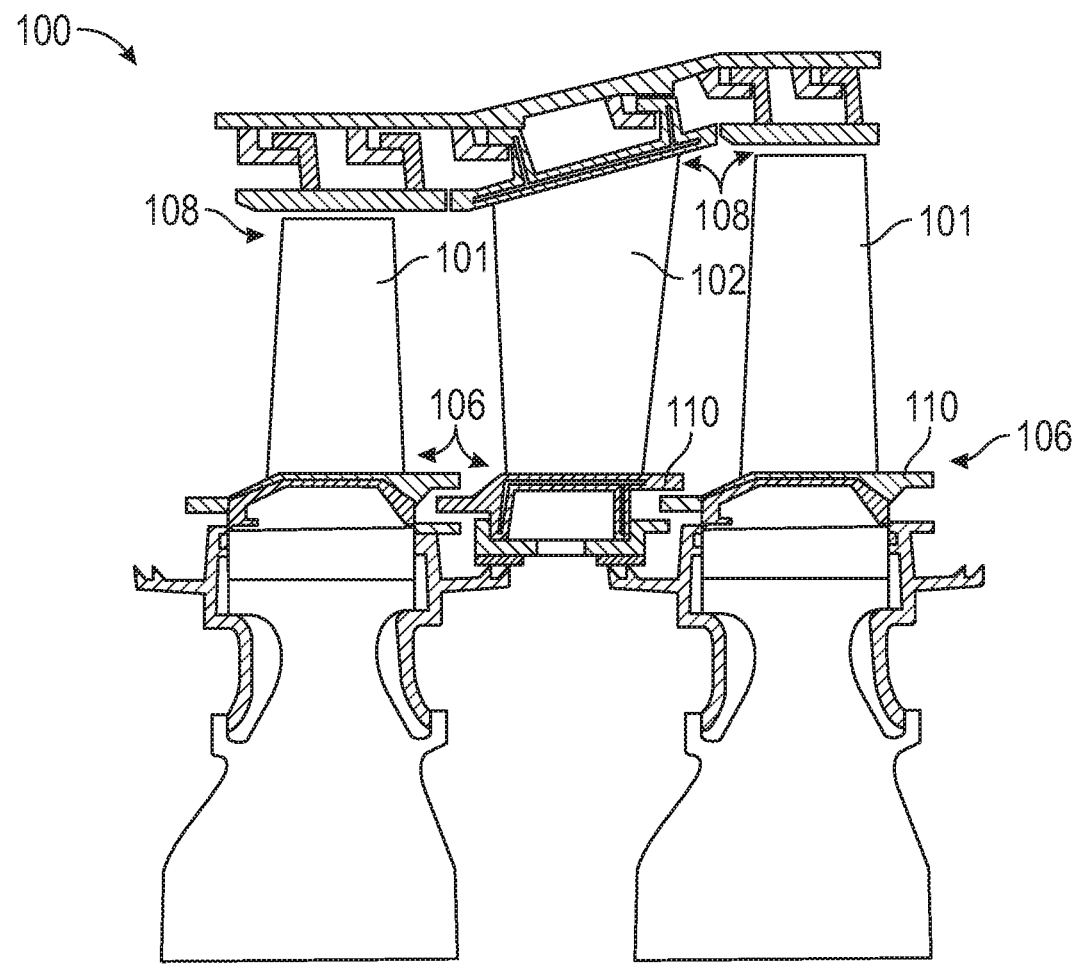
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes 102 may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110.

Although an aero or aircraft engine application is shown and described above, those of skill in the art will appreciate that airfoil configurations as described herein may be applied to industrial applications and/or industrial gas turbine engines, land based or otherwise.

Dual-wall cooling configurations are extremely efficient at cooling a component. For example, a vane or blade, such as airfoils 101, 102, may be formed with a dual-wall construction. Such dual-wall configuration may be a spar-and-shell arrangement, with a spar defining a structural body and a shell installed about the spar to provide a flow or exterior surface. Advantageously, such airfoil constructions can employ different materials for the spar and the shell, with the shell typically being made from high temperature alloys or material.

However, the internal wall typically runs a lot cooler than the external wall, creating a thermal conflict between the internal (spar) and external (shell) walls. The induced stresses from this thermal conflict may be extremely high and can be a challenge designing nickel components to handle such stresses. Furthermore, the thermal stresses are too high for the capability of often brittle, high-temperature materials, such as ceramic matrix composites (CMCs), making the conventional dual wall configurations impossible using high-temperature materials.

There are configurations that address the thermal conflict issue between the inner and outer walls. For example, the inner and outer walls may be arranged as a spar-and-shell design with connectors (e.g., pins, ribs, bars, etc.) that tie the shell to the spar. The connectors will physically connect the spar to the shell, but allow for thermal conflict. Such designs are arranged with radial cooling flow that provides for dedicated cooling in each separate radially extending passage (e.g., from the inner diameter to the outer diameter). Further improvements may be desirable.

One such further improvement upon the spar-and-shell configuration may relate to additional cooling schemes. A significant amount of the cooling flow exits the trailing edge of a component, such as at the trailing edge of a vane. Embodiments of the present disclosure are directed to creating an axial flow dual-wall cooling scheme that utilizes the trailing edge flow and minimizes the thermal conflict between the inner and outer walls. Moreover, in accordance with some embodiments described herein, an amount of flow required to cool a component may be minimized or reduced.

Embodiments of the present disclosure employ a connector configuration to join a spar and a shell, with the connectors being connected to both the spar and the shell. The connection by the connectors allows for axial thermal expansion or growth of the shell. Specifically, the connectors may move or rotate to allow for relative movement of the shell relative to the spar. The connectors, in some arrangements, may be configured half in the spar and half in the shell, and have a dog-bone, figure eight, infinity symbol geometry (i.e., lemniscate geometry in cross-section). In other embodiments, the connectors may have a cross-sectional geometry with a first engageable portion engageable with an exterior surface of the spar and a second engageable portion engageable with an interior surface of the shell, and a link connecting the first and second engageable portions. The connections by the engageable portions are not fixed connections, such that the engageable portions are rotatable within the connection to the respective spar or shell surface. The engageable portions may be connected to the respective spar and shell within grooves formed on the respective outer and inner surfaces thereof.

The connector is configured to prevent the shell from bulging away, circumferentially, from the spar, while allowing the hotter outer shell to grow axially more than the colder inner spar. As the hotter outer shell grows axially more than the colder inner spar, the connector pivots within respective grooves of the spar and the shell, minimizing the stresses on the spar and the shell. Embodiments provided herein are directed to a modification of the connector and/or connector engagements (e.g., a groove in the spar and the shell) by creating cutouts in the spar, shell, and/or connector to allow flow to communicate between the two adjacent cavities relative to the connector. Such a configuration allows for the trailing edge flow to be utilized in the dual-wall portion of the component before exiting the trailing edge, thus minimizing the amount of dedicated cooling in the dual-wall portion.

Figure 2:
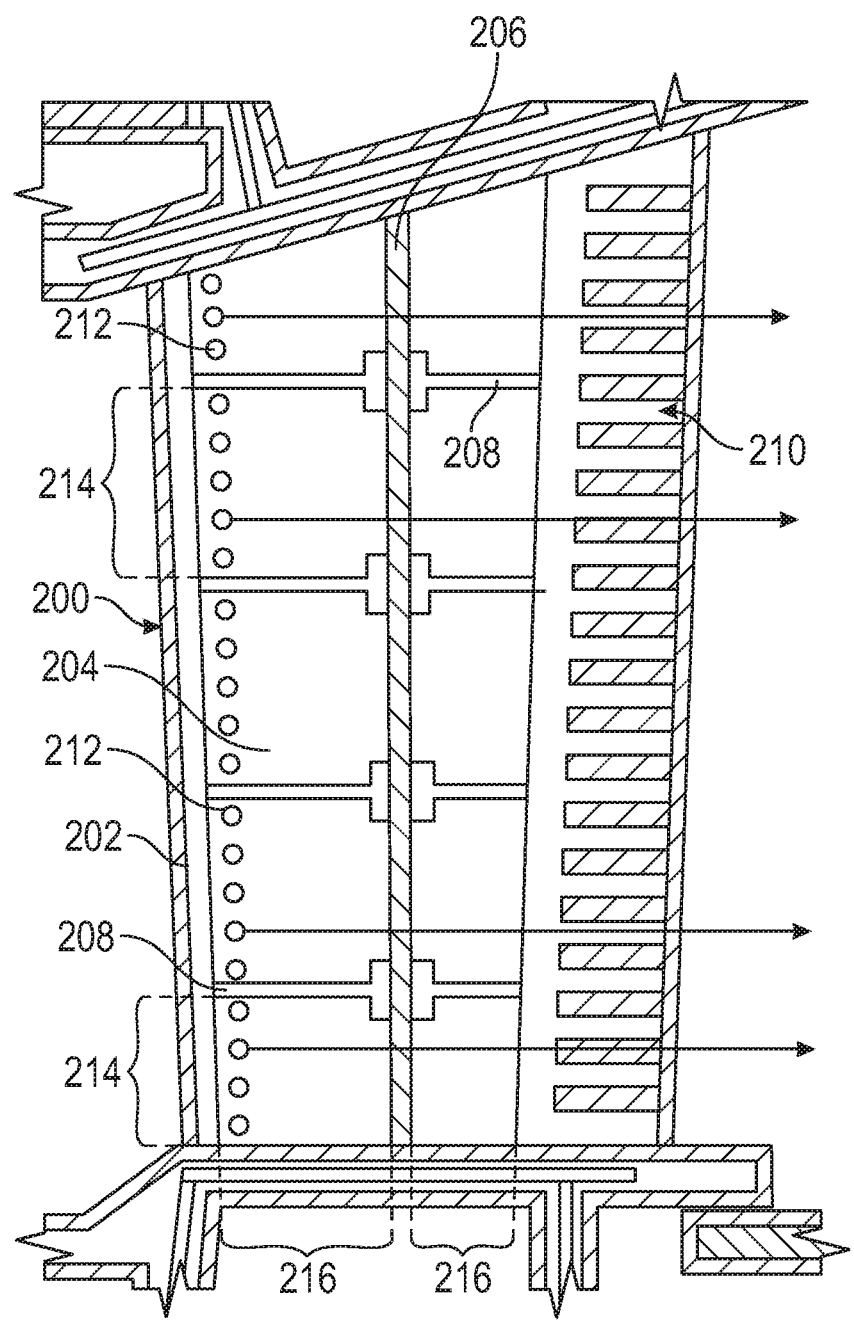
FIG. 2 is a schematic illustration of an airfoil in accordance with an embodiment of the present disclosure.

Turning now to FIG. 2, a schematic illustration of an airfoil 200 in accordance with an embodiment of the present disclosure is shown. The airfoil 200, in this illustrative embodiment, is arranged as a vane for a gas turbine engine. The airfoil 200 includes a shell 202 and a spar 204, with the spar 204 disposed inside the shell 202. The shell 202 defines an exterior surface of the airfoil 200 which may be exposed to a gaspath of a gas turbine engine. The spar 204 provides structural support and defines cooling cavities within the airfoil 200. Also shown in FIG. 2 is a connector 206 that attaches the shell 202 to the spar 204. The connector 206 extends radially through the airfoil 200, between the shell 202 and the spar 204. Additionally, one or both of the shell 202 and the spar 204 may include axial ribs 208 to define flow paths within the airfoil 200.

The airfoil 200 further includes a trailing edge cavity 210 through which cooling flow may exit the airfoil 200. Cooling air may be sourced from within the spar 204 and may impinge upon a leading edge of the airfoil 200, and upon an interior leading edge surface of the shell 202 through impingement holes 212. The cooling air may then flow axially aftward toward the trailing edge, through one or more axial flow paths 214. The axial flow paths 214 are defined between the shell 202 and the spar 204 and between radially adjacent axial ribs 208. The axial flow paths 214 may extend from the location of the impingement holes 212 (e.g., at the leading edge) axially aftward to the trailing edge cavity 210. Furthermore, radial flow paths 216 are defined, in part, by the radially extending connector 206. The radial flow paths 216 may receive cooling air from the inner diameter or the outer diameter of the airfoil 200 (e.g., through a platform) as will be appreciated by those of skill in the art.

Figure 3A:
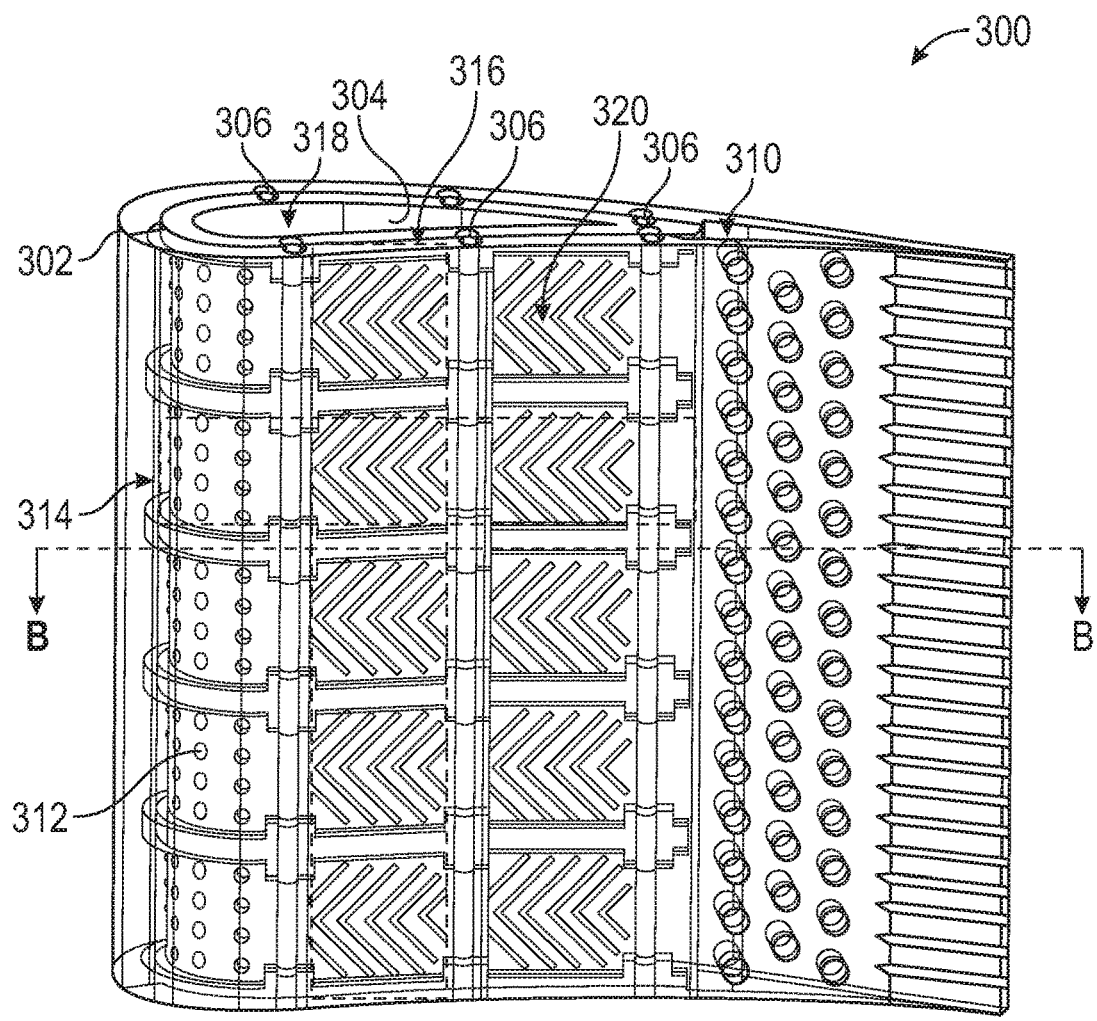
FIG. 3A is a schematic illustration of an airfoil as assembled in accordance with an embodiment of the present disclosure.
Figure 3B:
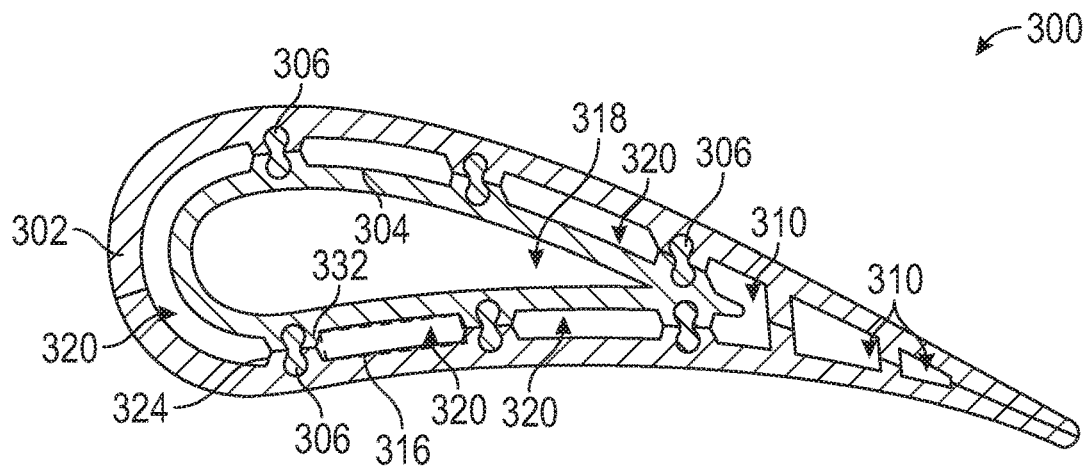
FIG. 3B is a plan cross-sectional view illustration of the airfoil of FIG. 3A as viewed along the line B-B.

Turning now to FIGS. 3A-3E, schematic illustrations of an airfoil 300, and parts thereof, in accordance with an embodiment of the present disclosure are shown. FIG. 3A is a schematic illustration of the airfoil 300 as assembled. FIG. 3B is a plan cross-sectional view illustration of the airfoil 300 as viewed along the line B-B of FIG. 3A. FIG. 3C is a schematic illustration of a portion of a shell 302 of the airfoil 300. FIG. 3D is a schematic illustration of a spar 304 of the airfoil 300. FIG. 3E is a schematic illustration of a connector 306 that connects the shell 302 to the spar 304 to form the airfoil 300.

As shown in FIGS. 3A-3B the spar 304 defines an inner cavity 318 and a plurality of outer cavities 320 are defined between the spar 304 and the shell 302. The outer cavities 320 are fluidly connected to define the flow paths of cooling air along an inner surface of the shell 302. The outer cavities 320 define axial flow paths 314 and radial flow paths 316. In some embodiments, cooling air may be supplied into the airfoil 300 in the inner cavity 318. The cooling air will cool the spar 304 and will then exit the inner cavity 318 through one or more impingement holes 312 and enter the outer cavities 320 at the leading edge of the airfoil 300. The cooling air will then flow axially aftward toward the trailing edge and flow into the trailing edge cavity 310 (i.e., along the axial flow paths 314). The cooling air will then exit the airfoil 300 out from the trailing edge cavity 310. In some embodiments, additional cooling air may be directly fed into the outer cavities 320 in a radial direction (i.e., along the radial flow paths 316), which may mix with the cooling air from the inner cavity 318 that is flowing along the axial flow paths 314.

Further, as shown in FIG. 3B, the shell 302 is joined or connected to the spar 304 by one or more connectors 306. The connectors 306 extend radially through the airfoil 300, between the shell 302 and the spar 304. In some embodiments, the connectors 306 may extend a full length from a root-to-tip or inner diameter-to-outer diameter (e.g., as shown). In other embodiments, the connectors may be partial-extent connectors that extend less than the full length between ends (e.g., top and bottom in the radial direction) of the airfoil. In some other embodiments, as shown and described below, the connectors 306 may have a cross-sectional geometry with a first engageable portion engageable with an exterior surface of the spar 304 and a second engageable portion engageable with an interior surface of the shell 302, and a link connecting the first and second engageable portions.

FIG. 3C illustrates a partial internal illustration of the shell 302. As shown, the shell 302 includes a plurality of first receiving channels 322. The first receiving channels 322 are grooves or recesses formed in the interior surface of the shell 302 to enable receiving and engagement with the connector 306. The first receiving channels 322 extend radially along the interior surface of the shell 302. In some embodiments, the first receiving channels 322 extend radially between a first end of the shell 302 to a second end of the shell 302 (e.g., between inner and outer diameters, between root and tip, etc.). Arranged along the first receiving channels 322 are first engagement elements 324. The first engagement elements 324 may be tabs or other types of protrusions that are located adjacent the first receiving channels 322. The first engagement elements 324 are configured to receive and engage with the connectors 306. The first engagement elements 324 are discrete elements that do not extend the full radial length of the shell 302. That is, the first engagement elements 324 are located at specific positions, and there are first radial gaps 326 between the first engagement elements 324 arranged along a given first receiving channel 322. The first radial gaps 326 define, in part, the axial flow paths 314 shown in FIG. 3A. That is, the positioning and spacing of the first engagement elements 324 allows for a portion of cooling air to flow in the axial direction along the interior surface of the shell 302. The shell 302 further includes optional first axial ribs 328 which extend in the axial direction and further define the axial flow paths 314. The first axial ribs 328 extend between and/or connect axially adjacent first engagement elements 324, as illustratively shown. The first axial ribs 328 may align with the first engagement elements 324 (i.e., connect) to minimize blockage of axial flow.

FIG. 3D illustrates the spar 304. As shown, the spar 304 includes a plurality of second receiving channels 330. The second receiving channels 330 are grooves or recesses formed in the exterior surface of the spar 304 to enable receiving and engagement with the connector 306. The second receiving channels 330 extend radially along the exterior surface of the spar 304. In some embodiments, the second receiving channels 330 extend radially between a first end of the spar 304 to a second end of the spar 304 (e.g., between inner and outer diameters, between root and tip, etc.). Arranged along the second receiving channels 330 are second engagement elements 332. The second engagement elements 332 may be tabs or other types of protrusions that are located adjacent the second receiving channels 330. The second engagement elements 332 are configured to receive and engage with the connectors 306. The second engagement elements 332 are discrete elements that do not extend the full radial length of the spar 304. That is, the second engagement elements 332 are located at specific positions, and there are second radial gaps 334 between the second engagement elements 332 arranged along a given second receiving channel 330. The second radial gaps 334 define, in part, the axial flow paths 314 shown in FIG. 3A. That is, the positioning and spacing of the second engagement elements 332 allows for a portion of cooling air to flow in the axial direction along the exterior surface of the spar 304. The spar 304 further includes optional second axial ribs 336 which extend in the axial direction and further define the axial flow paths 314. The second axial ribs 336 extend between and/or connect axially adjacent second engagement elements 332, as illustratively shown. The second axial ribs 336 may align with the second engagement elements 332 (i.e., connect) to minimize blockage of axial flow. Also shown in FIG. 3D, the spar 304 includes impingement holes 312 along the leading edge of the spar 304 to fluidly connect the inner cavity 318 with the outer cavities defined between the spar 304 and the shell 302, when assembled.

Further, as shown in FIGS. 3C-3D, one or both of the interior surface of the shell 302 or the exterior surface of the spar 304 may include optional heat transfer augmentation features 338. The heat transfer augmentation features 338 may be formed as trip strips, pedestals, dimples, etc. and may be arranged along the surfaces of the shell 302 and/or the spar 304 that define the axial flow paths 314.

Turning to FIG. 3E, a schematic illustration of one connector 306 in accordance with an embodiment of the present disclosure is shown. The connector 306 is configured to fit within the first receiving channel 322 and the second receiving channel 330 when the shell 302 is positioned around the spar 304. When assembling the shell 302 to the spar 304, the first receiving channels 322 and the second receiving channels 330 align and can receive a connector 306. When the connector 306 is installed within the first receiving channel 322 and the second receiving channel 330 (i.e., between the spar 304 and the shell 302), the connector 306 will be engaged by the first engagement elements 324 and the second engagement elements 332. The first engagement elements 324 and the second engagement elements 332 can provide secure and semi-fixed engagement with the connector 306 such that the connector 306 can retain or hold the shell 302 to the spar 304, but also allow for movement of the shell 302 relative to the spar 304, such as due to thermal expansion or thermal growth.

FIG. 3E illustrates one connector 306. The connector 306 has a dog-bone, figure eight, infinity symbol geometry (i.e., lemniscate geometry in cross-section). In other embodiments, the connectors may have a cross-sectional geometry with a first engageable portion engageable with an exterior surface of the spar and a second engageable portion engageable with an interior surface of the shell, and a link connecting the first and second engageable portions. As shown in FIG. 3E, the connector 306 includes a first engageable portion 340 and a second engageable portion 342. The first engageable portion 340, in this embodiment, is a continuous element that, when installed to the spar 304 and the shell 302, extends a full radial extent of the airfoil 300. The second engageable portion 342 is a discontinuous or segmented element having connector gaps 344 separating sections or segments of the second engageable portion 342. The connector gaps 344 are configured to align with the first and second radial gaps 326, 344 of the shell 302 and the spar 304 to form and define the axial flow paths 314. The connector 306 shown in FIGS. 3A-3E may be installed such that the first engageable portion 340 and the second engageable portion 342 are interchangeable, such that one or the other may be engaged with one or the other of the first receiving channels 322 or the second receiving channels 330. That is, the specific installation and orientation for which of the first engageable portion 340 and the second engageable portion 342 engage with the first and second engagement elements 324, 332 of the shell 302 and the spar 304 is arbitrary and either orientation is possible without departing from the scope of the present disclosure.

Figure 4A:
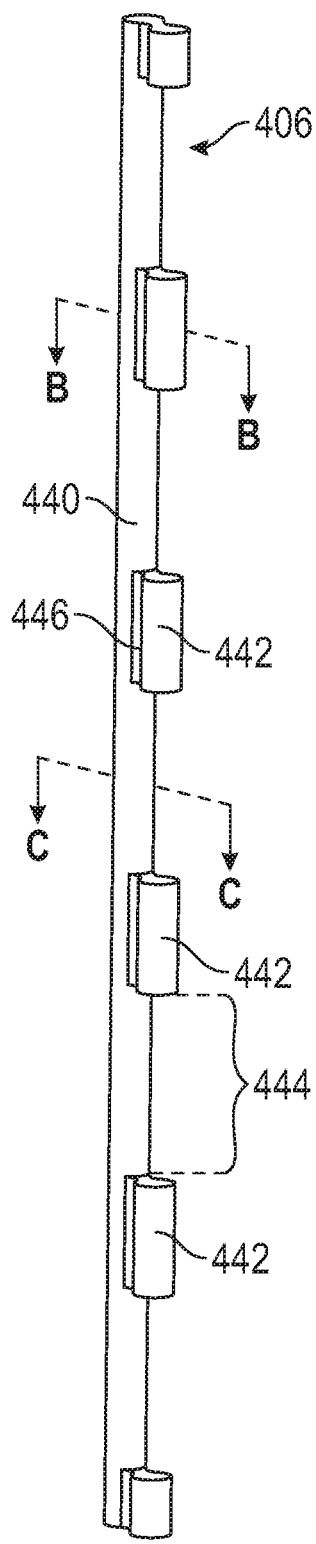
FIG. 4A is an isometric illustration of a connector in accordance with an embodiment of the present disclosure.
Figure 4B:
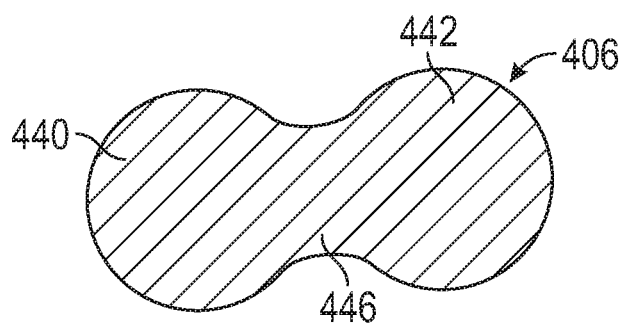
FIG. 4B is a cross-sectional illustration of the connector of FIG. 4A as viewed along the line B-B.
Figure 4C:
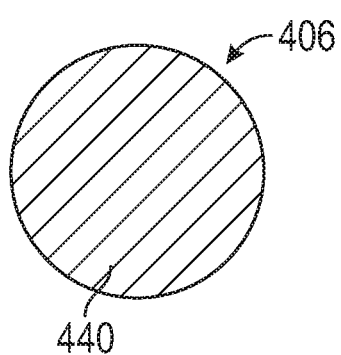
FIG. 4C is a cross-sectional illustration of the connector FIG. 4A as viewed along the line C-C.

Turning now to FIGS. 4A-4C, schematic illustrations of a connector 406 in accordance with an embodiment of the present disclosure. The connector 406 may be used to attach and connect a shell to a spar, as shown and described above. FIG. 4A is an isometric illustration of the connector 406; FIG. 4B is a cross-sectional illustration of the connector 406 as viewed along the line B-B of FIG. 4A; and FIG. 4C is a cross-sectional illustration of the connector 406 as viewed along the line C-C of FIG. 4A.

As shown, the connector 406 includes a first engageable portion 440, a second engageable portion 442, and a link 446 connecting the first engageable portion 440 to the second engageable portion 442. The first engageable portion 440 is a continuous element or structure and the second engageable portion 442 is a discontinuous or segmented element or structure. The elements of the second engageable portion 442 are separated by connector gaps 444. The connector gaps 444 are configured to define, in part, axial flow paths through a cavity or to connect cavities of an airfoil, i.e., between a shell and spar, as shown and described above. FIGS. 4B and 4C illustrate cross-sectional illustrations of the connector 406, with FIG. 4B illustrating the link 446 connecting the first engageable portion 440 to the second engageable portion 442. The geometric shape of the cross-section of the first engageable portion 440 to the second engageable portion 442 is such that the connector 406 can be installed within an airfoil to connect a shell to a spar, as shown and described above.

Figure 5A:
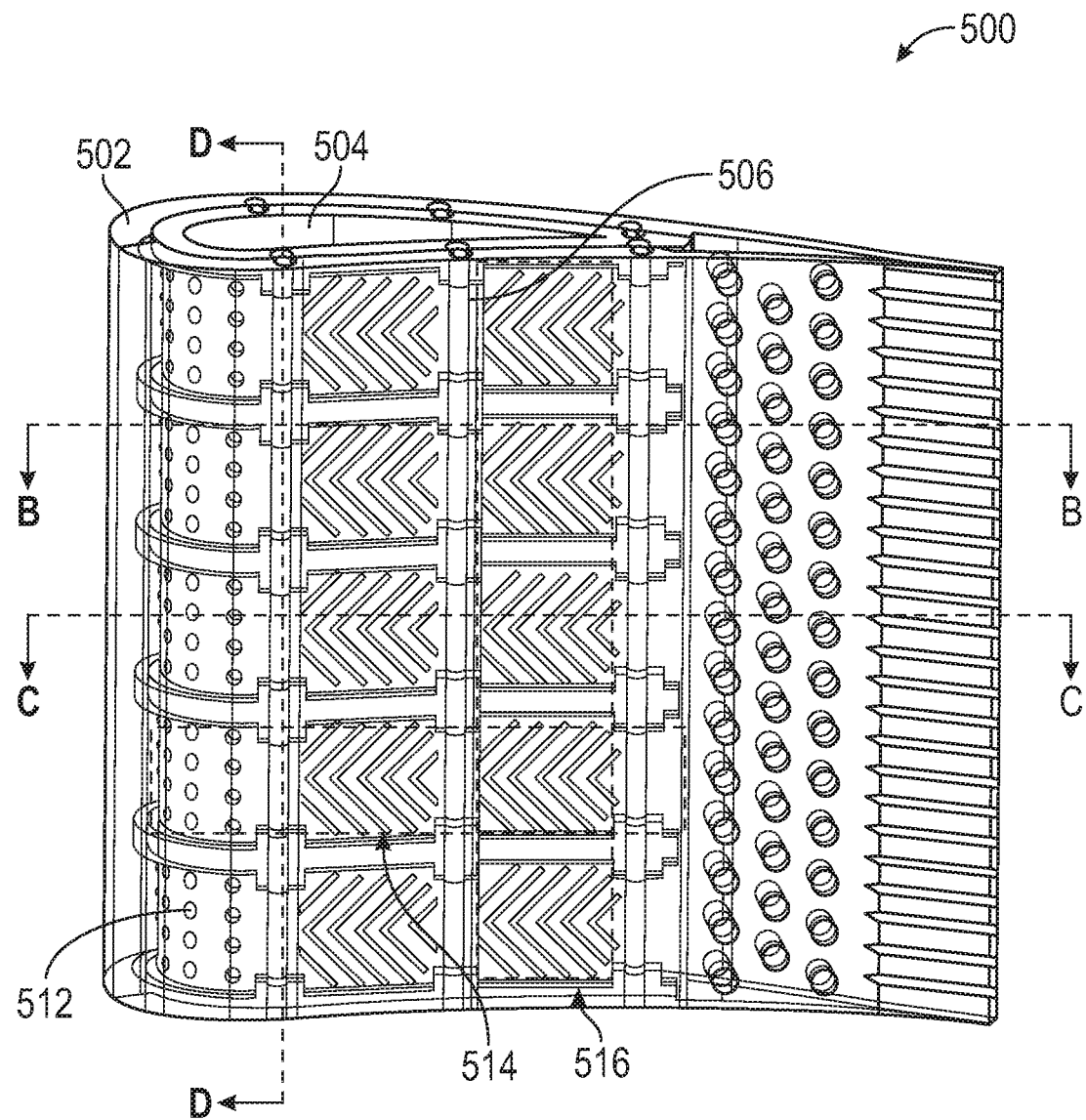
FIG. 5A is an isometric illustration of an airfoil in accordance with an embodiment of the present disclosure.
Figure 5B:
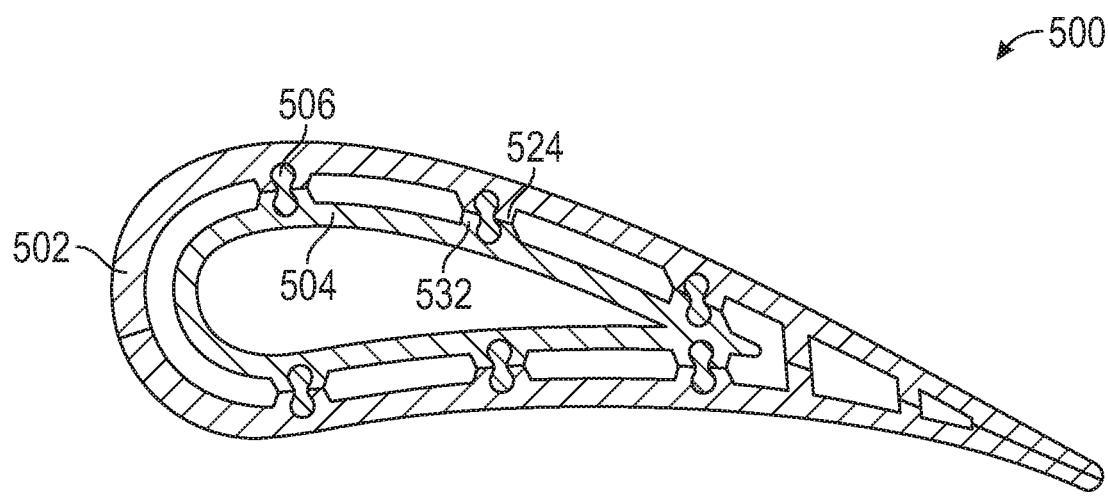
FIG. 5B is a cross-sectional illustration of the airfoil of FIG. 5A as viewed along the line B-B.
Figure 5C:
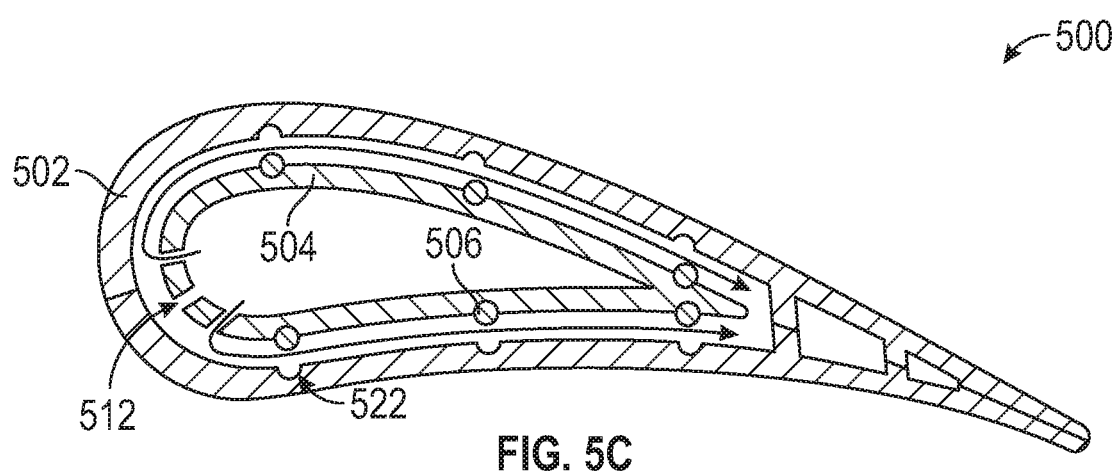
FIG. 5C is a cross-sectional illustration of the airfoil of FIG. 5A as viewed along the line C-C.
Figure 5D:
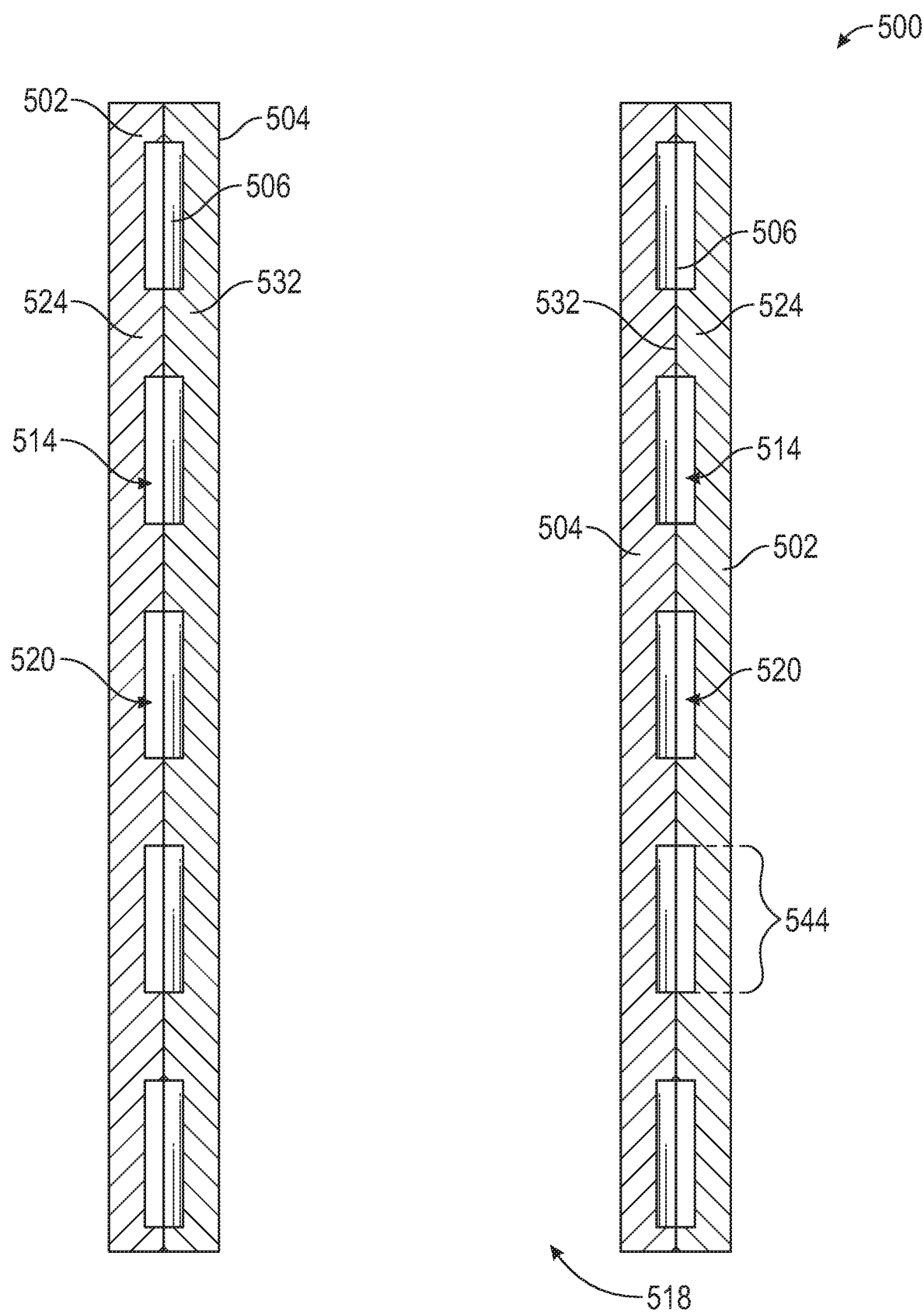
FIG. 5D is a cross-sectional illustration of the airfoil of FIG. 5A as viewed along the line D-D.

Turning now to FIGS. 5A-5D, schematic illustrations of an airfoil 500 in accordance with an embodiment of the present disclosure is shown. FIG. 5A is an isometric illustration of the airfoil 500, FIG. 5B is a cross-sectional illustration of the airfoil 500 as viewed along the line B-B of FIG. 5A, FIG. 5C is a cross-sectional illustration of the airfoil 500 as viewed along the line C-C of FIG. 5A, and FIG. 5D is a cross-sectional illustration of the airfoil 500 as viewed along the line D-D of FIG. 5A. The airfoil 500 may be similar to that shown and described above, having a shell 502 attached to a spar 504 by one or more connectors 506. The shell 502, spar 504, and connectors 506 define an outer cavity (or cavities) that include axial flow paths 514 and radial flow paths 516, as shown and described above.

The connectors 506 connect the shell 502 to the spar 504 at engagement elements 524, 532, as shown and described above. Further, the connectors 506 fit within respective receiving channels of the shell 502 and the spar 504. In this configuration, first receiving channels 522 are shown in FIG. 5C, where connector gaps are located and thus the connector 506 does not include an engageable portion at such locations. The gaps allow for axial flow of cooling air, as illustratively shown. As can be seen in FIG. 5B as well as FIG. 5D, the engagement tabs 524, 532 of the shell 502 and the spar 504 do not span all the way across the outer cavity between the shell 502 and the spar 504. Rather, the engagement tabs 524, 532 only span partway across to meet up with the corresponding engagement tab on the other part. In FIG. 5B, the connections of the connectors 506 to both the shell 502 and the spar 504 (at the engagement elements 524, 532) forms a blockage where air cannot flow axially. As illustratively shown, the cooling air is sourced from impingement holes 512 located at the leading edge or axially forward section of the spar 504.

FIG. 5D illustrates an inner cavity 518 formed within the spar 504 and an outer cavity 520 formed between the spar 504 and the shell 502. As shown, axial flow paths 514 form part of the outer cavity 520 and are defined by the spar 504, the shell 502, the engagement elements 524, 532, and connector gaps 544.

Although shown and described so far with the connector having a full extent or continuous engageable portion engaging with the spar, and a segmented or non-continuous engageable portion engaging with the shell, the opposite may be true. That is, the full extend or continuous engageable portion may engaged with the shell, and the segmented or non-continuous engageable portion may engage with the spar.

Figure 6B:
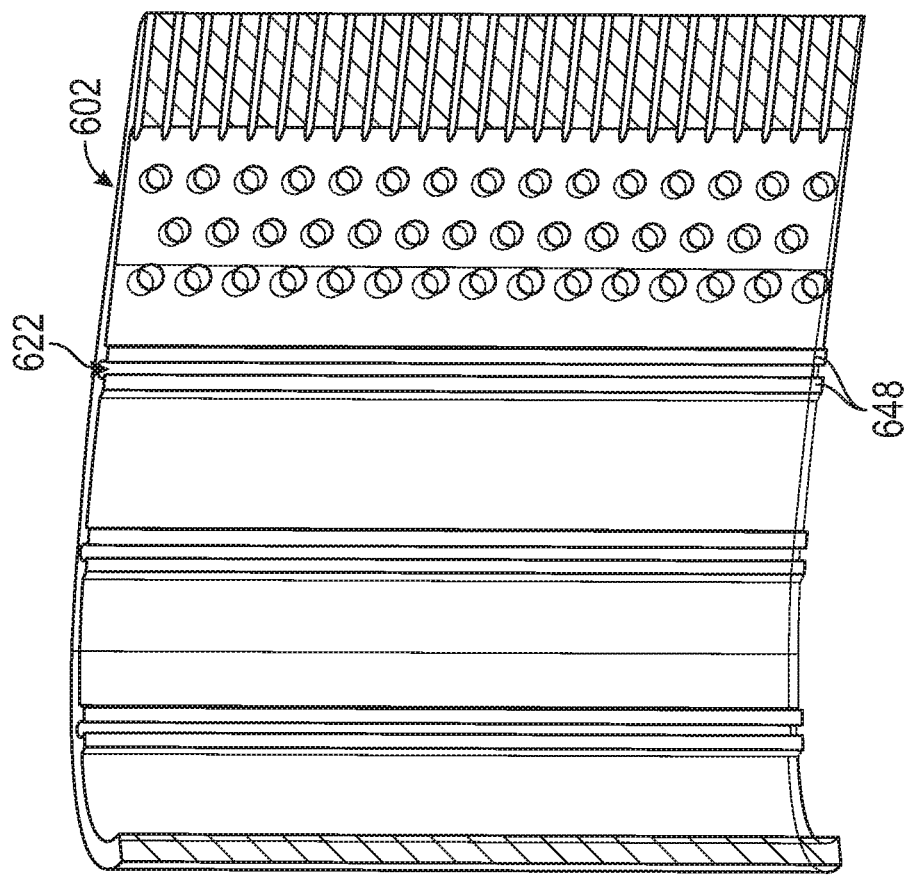
FIG. 6B is a schematic illustration of a portion of a shell in accordance with an embodiment of the present disclosure that is attachable to the spar of FIG. 6A.
Figure 6A:
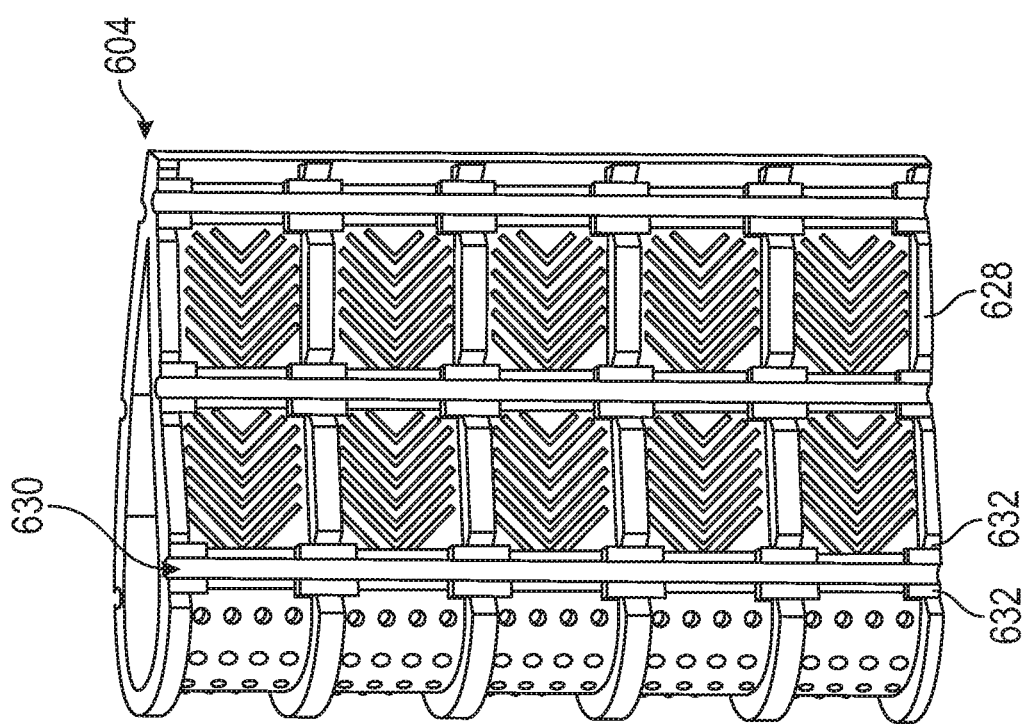
FIG. 6A is schematic illustration of a spar in accordance with an embodiment of the present disclosure.

Further, in some embodiments, one of the engagement elements of the spar or shell may be continuous in radial extent. That is, the engagement elements that are formed along the receiving channels are not required to be discrete or discontinuous elements in the radial direction. For example, turning to FIGS. 6A-6B, schematic illustrations of a spar 604 and a part of a shell 602 are shown. In FIG. 6A, the spar includes engagement elements 632 similar to that shown and described above, that are discrete and arranged along second receiving channels 630. Further, the spar 604 includes axial ribs 628. In this embodiment, however, the shell 602 includes continuous engagement elements 648 that extend a full radial length of the inner surface of the shell 602. In this embodiment, because the engagement elements 648 are full-length, the shell 602 does not include axial ribs. Further, the engagement elements 648 define and extend along first receiving channels 622. It will be appreciated by those of skill in the art that the opposite of that shown in FIGS. 6A-6B may be employed, where the spar includes full-length engagement elements and the shell includes segmented or discrete engagement elements. In these embodiments, the connector that joins the spar and the shell may be substantially similar to that shown and described above.

Turning now to FIGS. 7A-7D, schematic illustrations of a portion of a shell 702 (FIG. 7A), a spar 704 (FIG. 7B), and a connector 706 (FIG. 7C) used to form an airfoil 700 (shown in cross-section as assembled in FIG. 7D) in accordance with an embodiment of the present disclosure are shown.

FIG. 7A illustrates a partial internal illustration of the shell 702. As shown, the shell 702 includes a plurality of first receiving channels 722. The first receiving channels 722 are grooves or recesses formed in the interior surface of the shell 702 to enable receiving and engagement with the connector 706. The first receiving channels 722 extend radially along the interior surface of the shell 702. Arranged along the first receiving channels 722 are first engagement elements 724. The first engagement elements 724 may be tabs or other types of protrusions that are located adjacent the first receiving channels 722. The first engagement elements 724 are configured to receive and engage with the connectors 706. The first engagement elements 724 are discrete elements that do not extend the full radial length of the shell 702. That is, the first engagement elements 724 are located at specific positions, and there are first radial gaps 726 between the first engagement elements 724 arranged along a given first receiving channel 722. The first radial gaps 726 define, in part, the axial flow paths, as described above. That is, the positioning and spacing of the first engagement elements 724 allows for a portion of cooling air to flow in the axial direction along the interior surface of the shell 702. The shell 702 further includes optional first axial ribs 728 which extend in the axial direction and further define the axial flow paths. The first axial ribs 728 extend between and/or connect axially adjacent first engagement elements 724, as illustratively shown (but not all). The first axial ribs 728 may align with the first engagement elements 724 (i.e., connect) to minimize blockage of axial flow.

FIG. 7B is an illustrative illustration of the spar 704. As shown, the spar 704 includes a plurality of second receiving channels 730. The second receiving channels 730 are grooves or recesses formed in the exterior surface of the spar 704 to enable receiving and engagement with the connector 706. The second receiving channels 730 extend radially along the exterior surface of the spar 704. Arranged along the second receiving channels 730 are second engagement elements 732. The second engagement elements 732 may be tabs or other types of protrusions that are located adjacent the second receiving channels 730. The second engagement elements 732 are configured to receive and engage with the connectors 706. The second engagement elements 732 are discrete elements that do not extend the full radial length of the spar 704. That is, the second engagement elements 732 are located at specific positions, and there are second radial gaps 734 between the second engagement elements 732 arranged along a given second receiving channel 730. The second radial gaps 734 define, in part, the axial flow paths. That is, the positioning and spacing of the second engagement elements 732 allows for a portion of cooling air to flow in the axial direction along the exterior surface of the spar 704. The spar 704 further includes optional second axial ribs 736 which extend in the axial direction and further define the axial flow paths 714. The second axial ribs 736 extend between and/or connect axially adjacent second engagement elements 732, as illustratively shown. The second axial ribs 736 may align with the second engagement elements 732 (i.e., connect) to minimize blockage of axial flow. Also shown in FIG. 7B, the spar 704 includes impingement holes 712 along the leading edge of the spar 704 to fluidly connect the inner cavity with the outer cavities defined between the spar 704 and the shell 702, when assembled.

Further, as shown in FIGS. 7A-7B, one or both of the interior surface of the shell 702 or the exterior surface of the spar 704 may include optional heat transfer augmentation features 738. The heat transfer augmentation features 738 may be formed as trip strips, pedestals, dimples, etc. and may be arranged along the surfaces of the shell 702 and/or the spar 704 that define the axial flow paths 714.

Turning to FIG. 7C, a schematic illustration of one connector 706 in accordance with an embodiment of the present disclosure is shown. The connector 706 is configured to fit within the first receiving channel 722 and the second receiving channel 730 when the shell 702 is positioned around the spar 704. When assembling the shell 702 to the spar 704, the first receiving channels 722 and the second receiving channels 730 align and can receive a connector 706. When the connector 706 is installed within the first receiving channel 722 and the second receiving channel 730 (i.e., between the spar 704 and the shell 702), the connector 706 will be engaged by the first engagement elements 724 and the second engagement elements 732. The first engagement elements 724 and the second engagement elements 732 can provide secure and semi-fixed engagement with the connector 706 such that the connector 706 can retain or hold the shell 702 to the spar 704, but also allow for movement of the shell 702 relative to the spar 704, such as due to thermal expansion or thermal growth.

FIG. 7C illustrates one connector 706. The connector 706 has a dog-bone, figure eight, infinity symbol geometry (i.e., lemniscate geometry in cross-section). In other embodiments, the connectors may have a cross-sectional geometry with a first engageable portion engageable with an exterior surface of the spar and a second engageable portion engageable with an interior surface of the shell, and a link connecting the first and second engageable portions. As shown in FIG. 7C, the connector 706 includes a first engageable portion 740 and a second engageable portion 742, connected by a link, as shown and described above.

In contrast to the prior embodiments, both the first engageable portion 740 and the second engageable portion 742 are discontinuous or segmented elements having connector gaps 744 separating the discrete sections or segments of the respective first and second engageable portions 740, 742. The connector gaps 744 are configured to align with the first and second radial gaps 726, 744 of the shell 702 and the spar 704 to form and define the axial flow paths. The connector 706 shown in FIG. 7C may be installed such that the first engageable portion 740 and the second engageable portion 742 are interchangeable, such that one or the other may be engaged with one or the other of the first receiving channels 722 or the second receiving channels 730. That is, the specific installation and orientation for which of the first engageable portion 740 and the second engageable portion 742 engage with the first and second engagement elements 724, 732 of the shell 702 and the spar 704 is arbitrary and either orientation is possible without departing from the scope of the present disclosure.

Figure 7D:
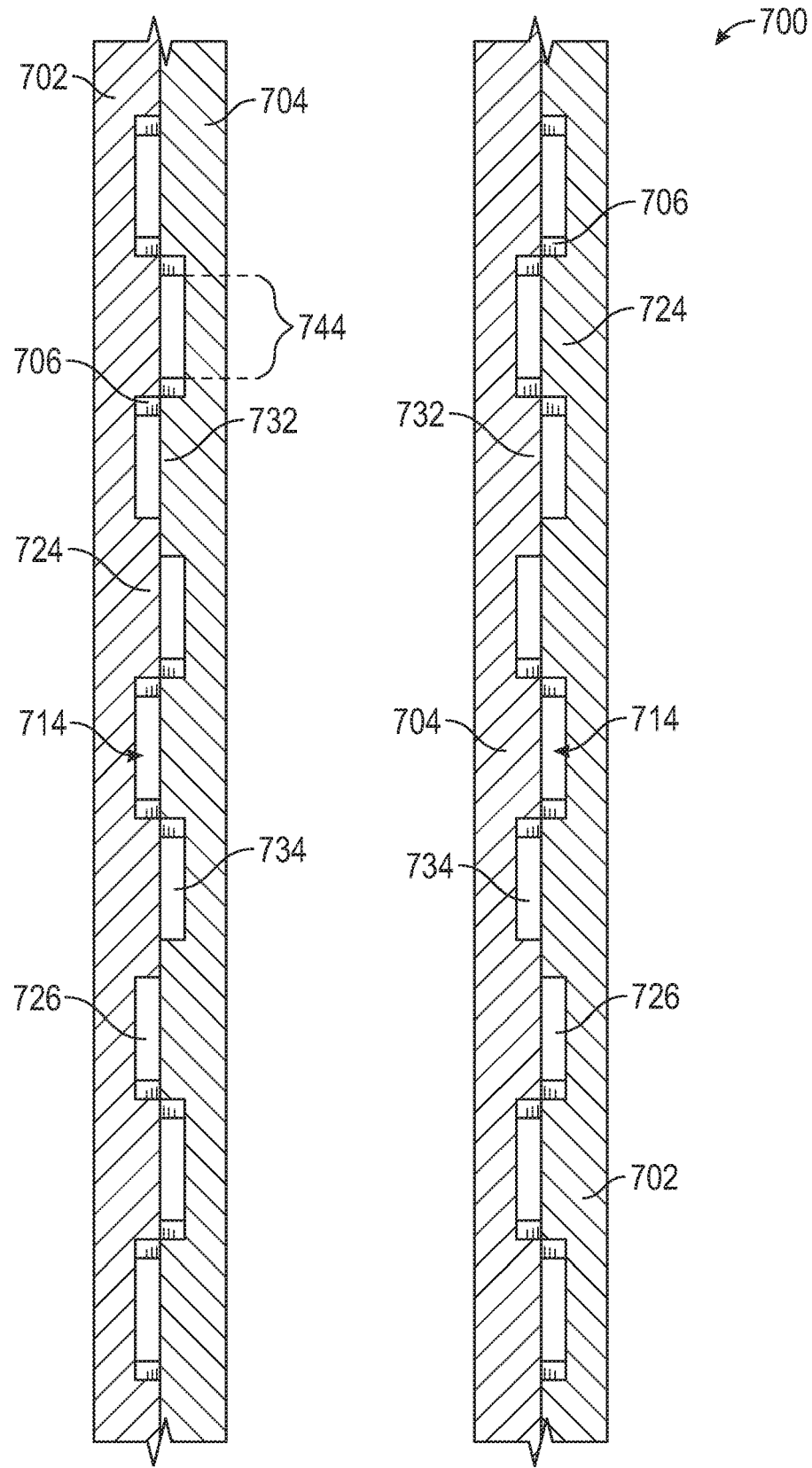
FIG. 7D is a schematic illustration of a portion of a formed airfoil using the spar, shell, and connector of FIGS. 7A-7C.

FIG. 7D illustrates a formed airfoil 700 as assembled from the shell 702, the spar 704, and connectors 706 (shown in FIGS. 7A-7C). The assembled airfoil 700 includes axial flow paths 714 that are formed in an alternating configuration due to the geometry of the connector 706 and the placement of the engagement elements 724, 732, and connector gaps 744 of the shell 702, the spar 704, and the connector 706. As can be seen in FIG. 7D, the shell engagement tabs 724 only span partway across the outer cavity between the shell 702 and the spar 704 and cooperate with the spar gaps 734 and the connector gaps 744 to form axial flow paths 714. Similarly, the spar engagement tabs 732 only span partway across the outer cavity between the shell 702 and the spar 704 and cooperate with the shell gaps 726 and the connector gaps 744 to form the axial flow paths 714.

The above described embodiments are provided to illustrative and explanatory purposes and are not intended to be limiting. For example, the structure of the shell, the spar, and/or the connector may be adjusted to provide a desired cooling scheme for an assembled airfoil. Further, although primarily shown as a vane, embodiments described herein are equally applicable to blades. Moreover, in the illustrations, a partial section of the shell is shown. This partial section may be representative of a piece that is assembled to one or more additional pieces to form the complete shell. However, in some embodiments, the shell may be a single continuous construction.

Advantageously, embodiment described herein provide for airfoils with improved cooling. Specifically, embodiments of the present disclosure provide for improved cooling and construction of spar-and-shell type airfoils. Embodiments of the present disclosure provide cutouts in the spar, shell, and connectors to allow trailing edge flow to be utilized in the dual-wall portion of the airfoil. Such use of trailing edge flow may simultaneously minimize a required dedicated cooling for the dual-wall portion of the airfoil as well as reducing the stresses in the spar and shell caused by thermal growth mismatch. Advantageously, unlike prior spar-and-shell systems, embodiments provided herein may be utilized in both nickel and CMC applications.

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An airfoil of a gas turbine engine comprising:
   a shell having a first receiving channel and a first engagement element arranged along the first receiving channel, the first receiving channel extending in a radial direction along the shell between a first end and a second end of the shell in the radial direction;
   a spar having a second receiving channel and a second engagement element arranged along the second receiving channel, the second receiving channel extending in a radial direction along the spar between a first end and a second end of the spar in the radial direction, wherein the spar defines an inner cavity; and
   a connector configured to be installed between the shell and the spar to connect the shell to the spar to allow for thermal growth of the shell relative to the spar, wherein the connector comprises a first engageable portion and a second engageable portion connected by a link, wherein the first engageable portion is configured to engage with the first engagement element of the shell and the second engageable portion is configured to engage with the second engagement element of the spar,
   wherein when assembled an outer cavity is formed between the spar and the shell, and
   wherein the first engagement element, second engagement element, the first engageable portion, and the second engageable portion are configured to define an axial flow path through the outer cavity.

2. The airfoil of claim 1, further comprising at least one axial rib on at least one of the shell and the spar, wherein the at least one axial rib defines, in part, the axial flow path in the outer cavity.

3. The airfoil of claim 1, wherein the spar further comprises at least one impingement hole on a leading edge thereof.

4. The airfoil of claim 3, wherein, when assembled, impinging air is configured to flow from the inner cavity to the outer cavity at an inner surface leading edge of the shell and flow axially aftward through the axial flow path of the outer cavity.

5. The airfoil of claim 1, further comprising at least one heat transfer augmentation feature formed on at least one of an inner surface of the shell and an outer surface of the spar such that the at least one heat transfer augmentation feature is located within the outer cavity when the shell is attached to the spar by the connector.

6. The airfoil of claim 5, wherein both the inner surface of the shell and the outer surface of the spar comprise at least one heat transfer augmentation feature.

7. The airfoil of claim 1, wherein the connector has a lemniscate geometry in cross-section.

8. The airfoil of claim 1, wherein the shell is formed from at least one of nickel and ceramic matrix composite.

9. The airfoil of claim 1, wherein at least one of the first engageable portion and the second engageable portion of the connector comprise a segmented structure.

10. The airfoil of claim 9, wherein the segmented structure of the at least one of the first engageable portion and the second engageable portion defines connector gaps separating segments thereof.

11. The airfoil of claim 9, wherein both the first engageable portion and the second engageable portion of the connector comprise segmented structures.

12. The airfoil of claim 1, wherein the first engageable portion is a continuous element that, when installed, extends a full radial extent of the airfoil and the second engageable portion of the connector comprises a segmented structure.

13. The airfoil of claim 1, wherein the first engagement element extends a continuous full radial extent in a radial direction along the shell between the first end and the second end of the shell about the first receiving channel.

14. The airfoil of claim 1, wherein the shell further comprises a trailing edge cavity that is fluidly connected to the outer cavity when the shell is assembled to the spar.

15. The airfoil of claim 1, wherein the shell, the spar, and the connector form one of a vane and a blade of a gas turbine engine.

16. The airfoil of claim 1, wherein the spar is formed from at least one of nickel and ceramic matrix composite.

17. The airfoil of claim 1, further comprising:
   a plurality of additional first receiving channels formed on the shell, wherein each additional first receiving channel includes at least one first engagement element arranged along a radial length thereof;
   a plurality of additional second receiving channels formed on the spar, wherein each additional second receiving channel includes at least one second engagement element arranged along a radial length thereof; and
   a plurality of additional connectors configured to be installed between the shell and the spar in the plurality of additional first and second receiving channels.

18. The airfoil of claim 1, wherein the outer cavity comprises one or more radial flow paths.

19. A spar for an airfoil of a gas turbine engine comprising:
- a spar body having a receiving channel and an engagement element arranged along the receiving channel, the receiving channel extending in a radial direction along the spar body between a first end and a second end of the spar body in the radial direction, wherein the spar body defines an inner cavity and wherein the receiving channel and the engagement element are arranged on an exterior surface of the spar body opposite the inner cavity,
- wherein the engagement element comprises one or more radial gaps that define axial flow paths relative to the receiving channel, and
- wherein the receiving channel and the engagement element are configured to receive a connector to attach a shell to the spar.

20. A shell for an airfoil of a gas turbine engine comprising:
- a shell body having a receiving channel and an engagement element arranged along the receiving channel, the receiving channel extending in a radial direction along the shell between a first end and a second end of the shell in the radial direction, the shell having an interior surface and an exterior surface, wherein the exterior surface defines a flow surface of the airfoil,
- wherein the engagement element comprises one or more radial gaps that define axial flow paths relative to the receiving channel, and
- wherein the receiving channel and the engagement element are configured to receive a connector to attach the shell to a spar.

* * * * *